(12) United States Patent
Takatori et al.

(10) Patent No.: US 12,064,953 B2
(45) Date of Patent: Aug. 20, 2024

(54) PRINTING MACHINE AND METHOD OF MONITORING STATE THEREOF

(71) Applicant: Toyo Seikan Co., Ltd., Tokyo (JP)

(72) Inventors: Iori Takatori, Yokohama (JP); Hanjiro Hokamura, Yokohama (JP); Osamu Hatano, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 65 days.

(21) Appl. No.: 17/516,806

(22) Filed: Nov. 2, 2021

(65) Prior Publication Data

US 2022/0055364 A1 Feb. 24, 2022

Related U.S. Application Data

(63) Continuation of application No. PCT/JP2020/004061, filed on Feb. 4, 2020.

(30) Foreign Application Priority Data

May 13, 2019 (JP) ................. 2019-090882

(51) Int. Cl.
*B41F 33/00* (2006.01)
*B41F 13/193* (2006.01)
(Continued)

(52) U.S. Cl.
CPC ............ *B41F 33/00* (2013.01); *B41F 13/193* (2013.01); *B41F 13/36* (2013.01); *B41F 17/22* (2013.01)

(58) Field of Classification Search
CPC ........ B41F 17/22; B41F 33/00; B41F 13/193; B41F 13/36; B41F 33/02
See application file for complete search history.

(56) References Cited

U.S. PATENT DOCUMENTS 4,693,178 A * 9/1987 Hudec .................... B41F 17/22
118/676
4,750,420 A 6/1988 Shriver
(Continued)

FOREIGN PATENT DOCUMENTS

DE 8813088 U1 12/1988
DE 10321359 B3 11/2004
(Continued)

OTHER PUBLICATIONS

Notice for Reasons of Refusal in Japanese Patent Application No. 2019-090882 with English translation.
(Continued)

*Primary Examiner* — Matthew G Marini
*Assistant Examiner* — Leo T Hinze
(74) *Attorney, Agent, or Firm* — BACON & THOMAS, PLLC

(57) ABSTRACT

A printing machine includes: a printing plate attached to a plate cylinder; a blanket configured to transfer ink from the printing plate to a printed material; a blanket wheel configured to rotate the blanket; and at least one of a distance sensor or a temperature sensor. The distance sensor is provided in the blanket wheel and configured to measure a distance of the printing plate to the blanket wheel, and the temperature sensor is provided in the blanket wheel and configured to measure a temperature of the printing plate.

12 Claims, 7 Drawing Sheets

(51) Int. Cl.
*B41F 13/36* (2006.01)
*B41F 17/22* (2006.01)

(56) References Cited

U.S. PATENT DOCUMENTS

| | | | |
|---|---|---|---|
| 5,201,272 | A | 4/1993 | Simon |
| 5,694,848 | A | 12/1997 | Palmatier |
| 6,167,805 | B1 | 1/2001 | Williams et al. |
| 2002/0189469 | A1 | 12/2002 | Gilliam |
| 2005/0005787 | A1 | 1/2005 | Roos |
| 2009/0223392 | A1 | 9/2009 | Iliescu |
| 2012/0216689 | A1 | 8/2012 | Cochran et al. |
| 2020/0130344 | A1* | 4/2020 | Egerton .................. B41F 17/22 |

FOREIGN PATENT DOCUMENTS

| | | |
|---|---|---|
| DE | 10-2004005602 A1 | 9/2005 |
| DE | 102010006781 A1 | 8/2011 |
| EP | 1477315 A1 | 11/2004 |
| EP | 1493565 A2 | 1/2005 |
| GB | 2299782 A | 10/1996 |
| JP | S60225758 A | 11/1985 |
| JP | H4-90351 | 3/1992 |
| JP | H9-295396 A | 11/1997 |
| JP | 2000-506091 A | 5/2000 |
| JP | 2002-137365 A | 5/2002 |
| JP | 2003-524536 A | 8/2003 |
| JP | 2008-132603 A | 6/2008 |
| JP | 2010-284829 A | 12/2010 |
| JP | 2017-144617 A | 8/2017 |
| WO | WO2011086044 A1 | 7/2011 |

OTHER PUBLICATIONS

Notice of Reasons for Refusal in Japanese Patent Application No. 2020-076718 with English translation.
"Wasserloser Offsetdruck. Öalternative Fur Wirtschaftliche, Hochwertige Und Umweltvertragliche Druckproduktion", Deutscher Drucker, Deutscher Drucker Verlagsgesellschaft, Ostfildern, DE , vol. 31 , No. 7 , Feb. 16, 1995 (Feb. 16, 1995).
EESR cited in corresponding European Appln. No. 20805603.6 dated May 9, 2023.

\* cited by examiner

PRINTING MACHINE AND METHOD OF MONITORING STATE THEREOF

CROSS-REFERENCE TO RELATED APPLICATIONS

The present application is a continuation application of PCT International Application No. PCT/JP2020/004061 filed on Feb. 4, 2020 and claims priority from Japanese Patent Application No. 2019-090882 filed on May 13, 2019, and the entire contents of which are hereby incorporated by reference.

BACKGROUND

1. Technical Field

The present invention relates to a printing machine and a method of monitoring the state of the printing machine.

2. Related Art

Generally, a printing machine monitors to know the state of each of components to find an abnormality. In particular, the plate pressure and the printing pressure of an offset printing machine are directly linked to the transferability of ink, and therefore it is important to correctly know the states of them to ensure the reproducibility of the printing.

A technology of knowing the state of the printing pressure by using a detector provided outside an impression cylinder and a plate cylinder to detect the distance between the spindle of the impression cylinder and that of the plate cylinder is disclosed, for example, in Japanese Patent Application Laid-Open No. 2017-144617. The entire contents of this disclosure are hereby incorporated by reference.

SUMMARY

A first aspect of the present invention provides a printing machine including: a printing plate attached to a plate cylinder; a blanket configured to transfer ink from the printing plate to a printed material; a blanket wheel configured to rotate the blanket; and at least one of a distance sensor or a temperature sensor. The distance sensor is provided in the blanket wheel and configured to measure a distance of the printing plate to the blanket wheel, and the temperature sensor is provided in the blanket wheel and configured to measure a temperature of the printing plate.

DETAILED DESCRIPTION

However, with the above-described related art, when the temperature of the plate cylinder or the impression cylinder is changed because, for example, the atmosphere temperature is changed, and therefore the plate cylinder or the impression cylinder is thermally deformed (expanded or contracted), it is difficult to accurately measure the printing pressure.

The present invention has been achieved in view of the above-described problem, and therefore it is desirable to provide a printing machine and a method of monitoring the state of the printing machine capable of correctly knowing the state of the printing machine to find an abnormality. According to an embodiment of the invention, it is possible to correctly know the state of the printing machine to find an abnormality.

The present invention is widely applicable to printing machines configured to print on the curved surface of a stereoscopic object such as a cylindrical object by using a printing plate and an intermediate transfer member. With embodiments, a case where the present invention is applied to an offset printing machine configured to print on the curved surface of a bottomed cylindrical-shaped container such as a can, a bin and a bottle will be described as examples.

Hereinafter, embodiments of the present invention will be described with reference to the drawings. Note that the following embodiments illustrate some examples of the invention, and are not intended to limit the subject matter of the invention. Moreover, all the configurations and operations described in the embodiments are not necessarily essential to the invention.

<Basic Configuration of Printing Machine>

Figure 1:
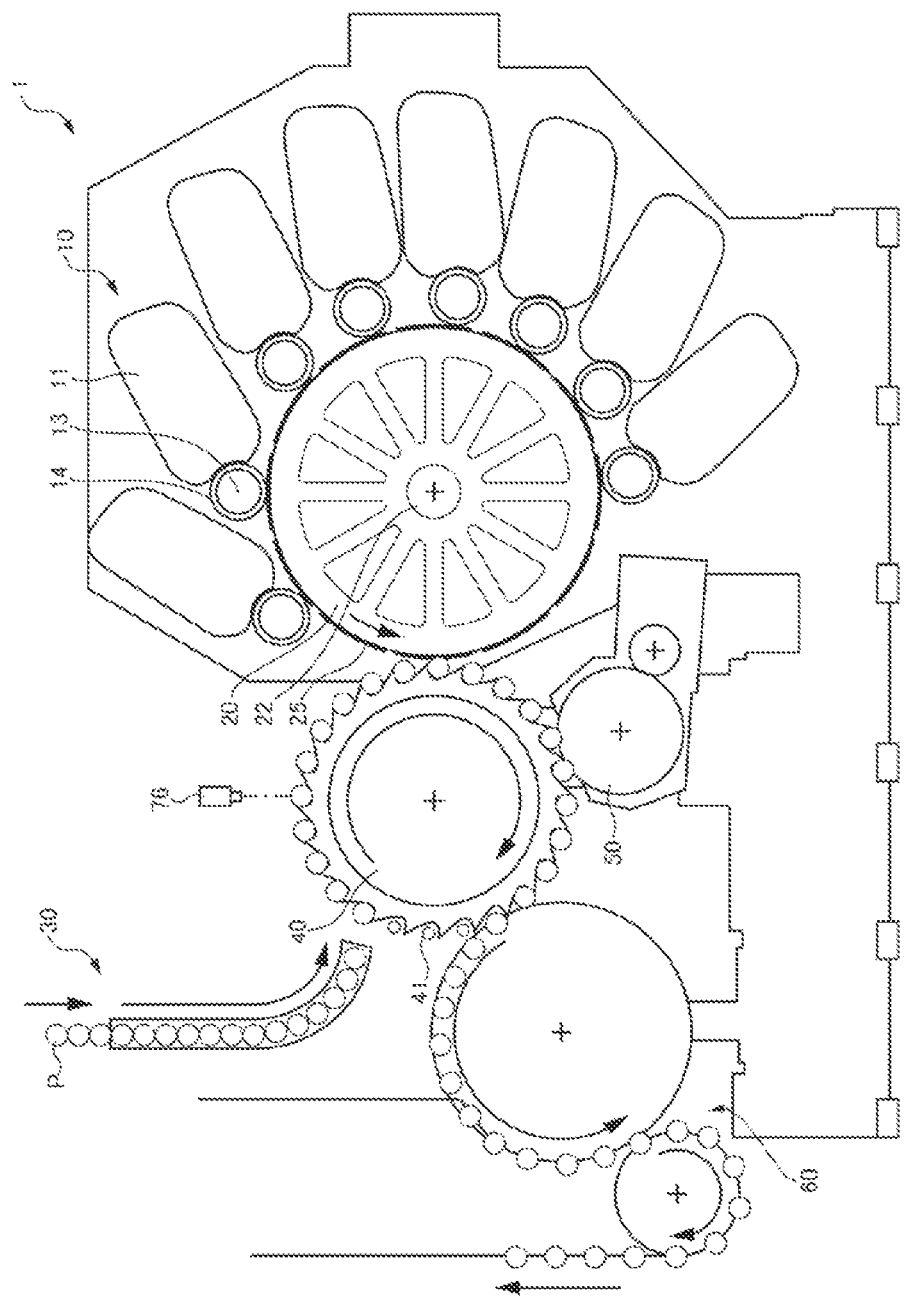
FIG. 1 schematically illustrates the basic configuration of a printing machine according to an embodiment.
Figure 2:
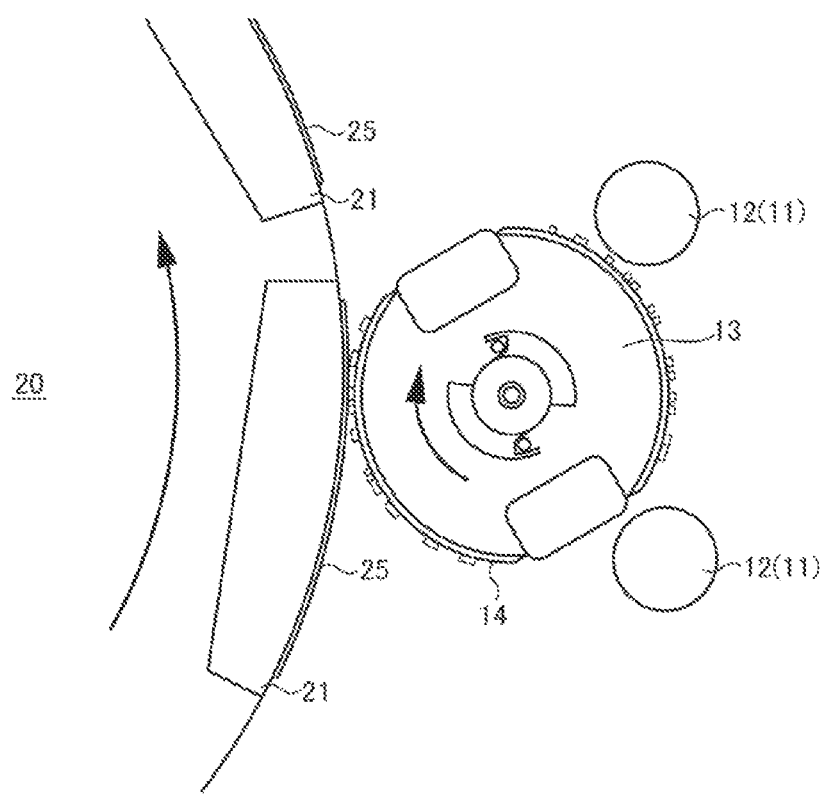
FIG. 2 is an enlarged view illustrating the vicinity of a contact region where a printing plate and a blanket illustrated in FIG. 1 contact one another.

FIG. 1 schematically illustrates the basic configuration of a printing machine 1 according to the present embodiment. FIG. 2 is an enlarged view illustrating the vicinity of a contact region where a printing plate 14 and a blanket 25 contact one another.

The printing machine 1 illustrated in FIG. 1 is an offset printing machine configured to print on a printed material P as a can body having an approximately cylindrical shape such as a two-piece can by transferring ink to the outer periphery of the can body.

As illustrated in FIG. 1, the printing machine 1 includes a plurality of inking units 10, a blanket wheel 20, a conveyance unit 30, a mandrel wheel 40, a burnish applicator 50, and a transport unit 60.

Each of the inking units 10 is a device configured to supply the printing plate 14 with ink. The inking unit 10 may be referred to as an inker unit. The plurality of inking units 10 are provided for colors different from each other. The plurality of inking units 10 are provided along the outer periphery of the blanket wheel 20. Each of the inking units 10 includes an ink supply 11 configured to store predetermined ink and a plate cylinder 13 with a printing plate 14 for the predetermined ink.

As illustrated in FIG. 2, the ink supply 11 includes an ink roller group 12 of fountain rollers or foam rollers. The ink supply 11 supplies the ink stored in an ink storage (not shown) to the printing plate 14 attached to the plate cylinder 13 by rotating the rollers of the ink roller group 12. Temperature-controlled water is circulated in some of the rollers of the ink roller group 12 to properly keep the temperature of the ink.

Each of the plate cylinders 13 has an approximately cylindrical shape and can rotate about its spindle. The printing plate 14 is detachably attached to the outer periphery of the plate cylinder 13. The plate cylinder 13 is provided such that the distance of the plate cylinder 13 to the blanket wheel 20 can be changed. The printing plate 14 may be, for example, a waterless lithographic plate in which non-image areas without ink are formed by a silicone resin layer, or a resin letterpress plate in which image areas with ink are formed by a photosensitive resin layer. A supply opening to blow cold air out is formed near the plate cylinder 13 to properly keep the temperature of the plate cylinder 13 and the printing plate 14.

The blanket wheel 20 is a device configured to rotate in contact with the printing plates 14 and the printed materials P. The blanket wheel 20 is configured to rotate the blankets 25 to transfer the ink from the printing plates 14 to the printed materials P. As illustrated in FIG. 1, the blanket wheel 20 has an approximately cylindrical shape and can rotate about a spindle 22. As illustrated in FIG. 2, a plurality of segments 21 are provided on the outer periphery of the blanket wheel 20 at predetermined intervals along the circumferential direction of the blanket wheel 20. The blanket 25 is attached to the outer surface of each of the plurality of segments 21. For the printing machine 1 illustrated in FIG. 1, twelve blankets 25 are attached to the segments 21, respectively.

Each of the blankets 25 is an intermediate transfer member configured to mediate the transfer of the ink from the printing plate 14 to the printed material P. The blanket 25 includes a base material layer made of fabrics and foams, and a rubber layer made of, for example, acrylonitrile butadiene rubber. The base material layer is detachably attached to the outer surface of the segment 21 via adhesive and so forth. The ink on the printing plate 14 is transferred to the rubber layer. The rubber layer is disposed on the outer surface of the base material layer to form the outer surface of the blanket 25.

The conveyance unit 30 is a device configured to convey the printed materials P which have not been printed to the mandrel wheel 40. As illustrated in FIG. 1, the conveyance unit 30 is provided above the mandrel wheel 40. In the rotating direction of the mandrel wheel 40, the conveyance unit 30 is provided upstream from the contact region where the printed material P held by the mandrel 41 contacts the blanket 25. The conveyance unit 30 sequentially conveys the printed materials P one by one from above the mandrel wheel 40 to the upper part of the mandrel wheel 40 by the gravity of the printed material P.

The mandrel wheel 40 is a device configured to rotate the mandrels 40 holding the printed materials P. The mandrel wheel 40 is provided next to the blanket wheel 20 in the radial direction of the blanket wheel 20. The mandrel wheel 40 has an approximately circular disc shape and can rotate about its spindle. A plurality of mandrels 41 are provided on the outer periphery of the mandrel wheel 40 at predetermined intervals along the circumferential direction of the mandrel wheel 40.

Each of the mandrels 41 has an approximately cylindrical shape that can be inserted into a can body as the printed material P. The plurality of mandrels 41 are provided to protrude in the direction to cross the circumferential direction of the mandrel wheel 40, and cantilevered by the outer periphery of the mandrel wheel 40. It is preferred that the number of the mandrels 41 is equal to the integral multiple of the number of the blankets 25. For the printing machine 1 illustrated in FIG. 1, twenty-four mandrels 41 are provided on the mandrel wheel 40.

The front end of the mandrel 41 sucks in the inner surface of the bottom of the can body as the printed material P by air suction, and therefore the printed material P is held by the mandrel 41. The posture of the mandrel 41 can be changed, and the position of the mandrel 41 also can be changed in the radial direction of the mandrel wheel 40. The mandrel 41 is provided to be able to rotate about the central axis of the mandrel 41 while holding the printed material P.

The burnish applicator 50 is a device configured to overcoat the inked-up printed material P with finish varnish. The burnish applicator 50 is provided next to the mandrel wheel 40 in the radial direction of the mandrel wheel 40. In the rotating direction of the mandrel wheel 40, the burnish applicator 50 is provided downstream from the contact region where the printed material P held by the mandrel 41 contacts the blanket 25.

The transport unit 60 is a device configured to transport the printed material P having passed through the burnish applicator 50 from the mandrel 41 to a drying device such as an oven to fix the ink and the overcoat to the printed material P. Transport unit 60 is provided next to the mandrel wheel 40 in the radial direction of the mandrel wheel 40. In the rotating direction of the mandrel wheel 40, the transport unit 60 is provided downstream from the contact region where the printed material P held by the mandrel 41 contacts the burnish applicator 50.

<Printing Operation of Printing Machine>

The printing operation of the printing machine 1 on the printed material P will be described. The printing machine 1 causes the conveyance unit 30 to convey the printed material P to the upper part of the mandrel wheel 40. The printing machine 1 causes the mandrel 41 to hold the printed material P having conveyed to the upper part of the mandrel wheel 40. Before the printed material P contacts the blanket 25, the printing machine 1 rotates the mandrel 41 to press and pin the printed material P, and then rotates the mandrel wheel 40 to move the printed material P to the contact region where the printed material P contacts the blanket 25. That is, the printed material P rotates about its axis by the rotation of the mandrel 41, and revolves about the mandrel wheel 40 by the rotation of the mandrel wheel 40.

In addition, the printing machine 1 rotates the ink roller group 12 to supply the ink stored in the ink supply 11 to the printing plate 14 attached to the plate cylinder 13. The inked-up printing plate 14 is moved to the contact region where the printing plate 14 contacts the blanket 25 by the rotation of the plate cylinder 13. The printing machine 1 rotates the blanket wheel 20 to contact the inked-up printing plate 14 with the blanket 25, so that the ink on the printing plate 14 is transferred to the blanket 25. By this means, the image in the pattern of the image area formed on the printing plate 14 is transferred to the blanket 25.

The inked-up blanket 25 is moved to the contact region where the printed material P contacts the blanket 25 by the rotation of the blanket wheel 20. Then, in the contact region, the blanket 25 contacts the printed material P while pressing the printed material P held by the mandrel 41 to transfer the ink on the blanket 25 to the printed material P. By this means, the image in the pattern of the image area formed on the printing plate 14 is transferred to the printed material P via the blanket 25.

The inked-up printed material P is moved to the burnish applicator 50, and then moved to the transport unit 60 by the rotation of the mandrel wheel 40. The printing machine 1 actuates the burnish applicator 50 to overcoat the inked-up printed material P. Moreover, the printing machine 1 actuates the transport unit 60 to transport the printed material P having passed through the burnish applicator 50 from the mandrel 41 to a drying device such as an oven.

Here, the printing machine 1 rotates the plate cylinders 13, the blanket wheel 20, the mandrels 41 and the mandrel wheel 40 in synchronization with each other. In addition, the printing machine 1 actuates the burnish applicator 50 and the transport unit 60 in synchronization with the rotations of them. In this way, the printing machine 1 prints on the printed materials P.

<Configuration to Monitor to Know the State of Printing Machine>

Figure 3:
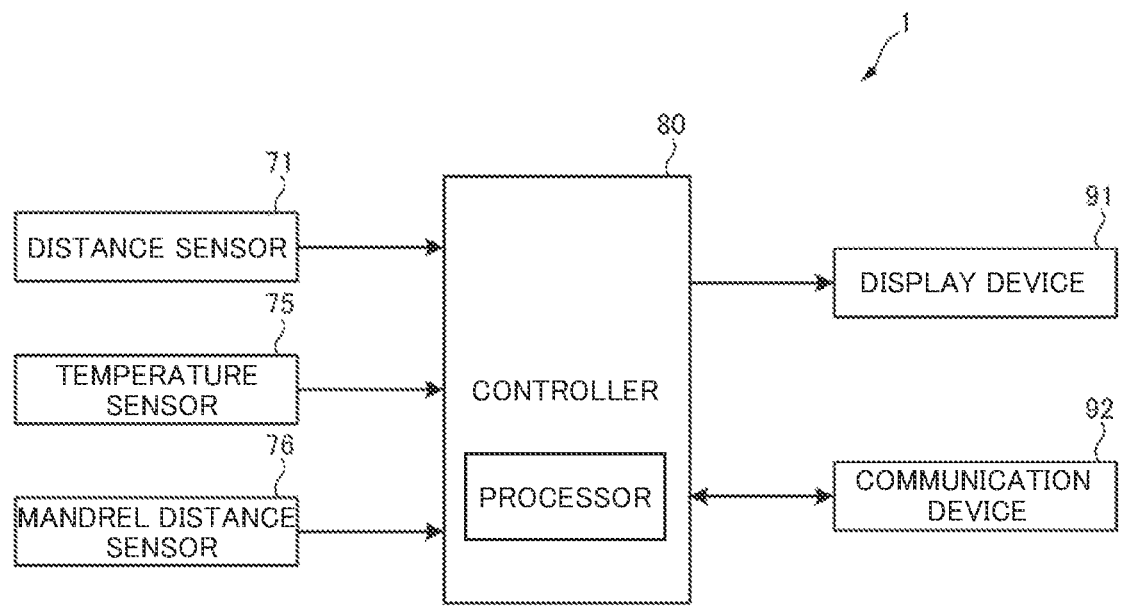
FIG. 3 illustrates the configuration of the printing machine illustrated in FIG. 1 to monitor to know the state of the printing machine in order to find an abnormality.
Figure 4:
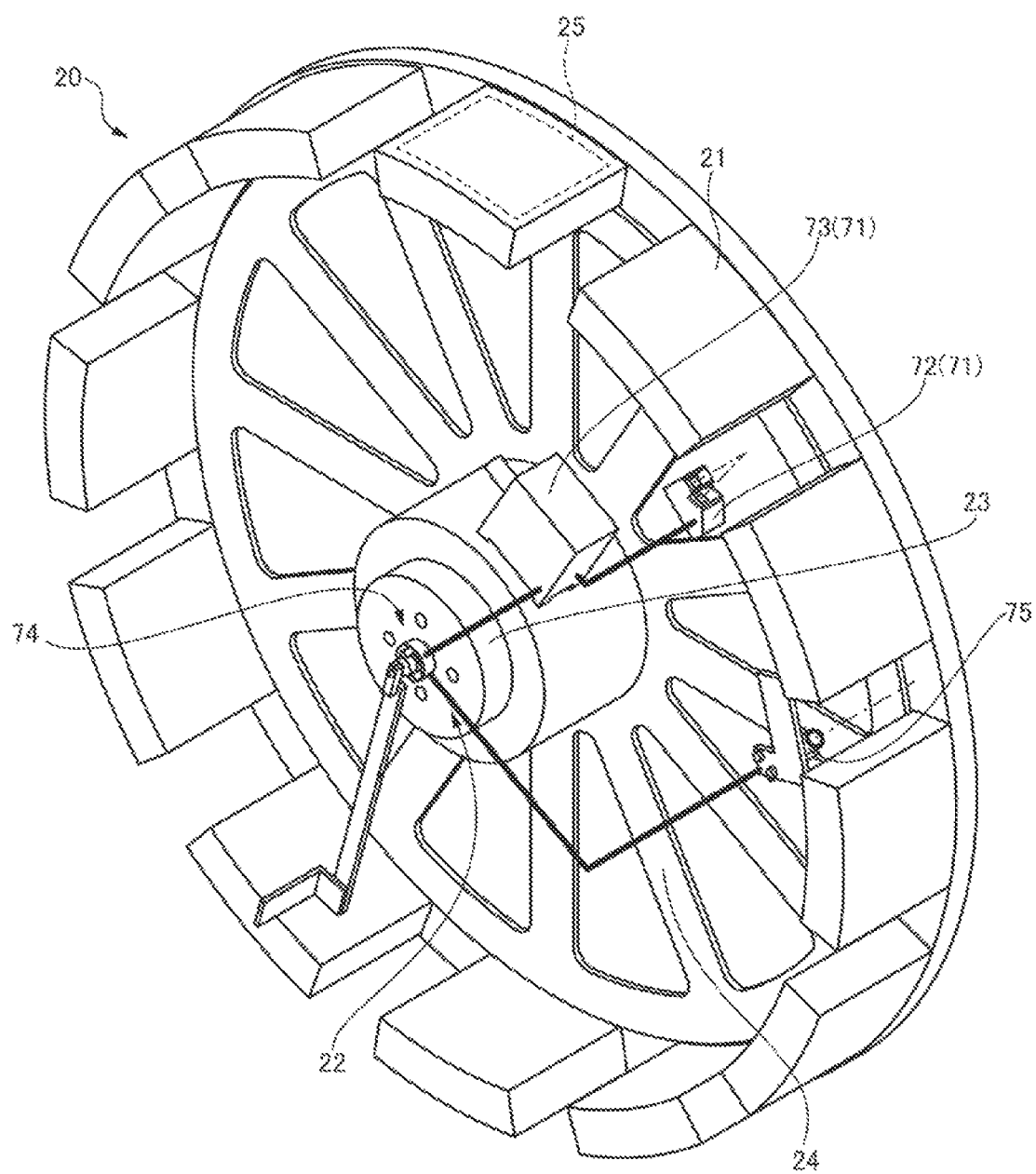
FIG. 4 illustrates an arrangement of a distance sensor and a temperature sensor illustrated in FIG. 3.

FIG. 3 illustrates the configuration of the printing machine 1 illustrated in FIG. 1 to monitor to know the state of the printing machine in order to find an abnormality. FIG. 4 illustrates an arrangement of a distance sensor 71 and a temperature sensor 75 illustrated in FIG. 3.

The printing machine 1 is capable of monitoring to know the state of each of the components of the printing machine 1 to find an abnormality. To be more specific, the printing machine 1 collects information indicating the state of each of the components of the printing machine 1, which is important to ensure the reproducibility of the printing, visualizes the information, and then evaluates the visualized information. By this means, it is possible to determine whether each of the components of the printing machine 1 operates in the proper state.

The information indicating the state of each of the components of the printing machine 1, which is important to ensure the reproducibility of the printing, may include the plate pressure, the printing pressure, the plate surface temperature, the atmosphere temperature and humidity of the printing machine 1, the temperature of the printed material P (can), the temperature of the mandrel 41, the position of the mandrel 41, and the temperature of the ink roller group 12. The plate pressure is generated by the contact between the plate surface which is the outer surface of the printing plate 14 and the outer surface of the blanket 25. The printing pressure is generated by the contact between the surface of the printed material P and the outer surface of the blanket 25. The plate surface temperature is the temperature of the surface of the printing plate 14. The atmosphere temperature and humidity of the printing machine 1 includes the temperature and humidity of the areas above and under the blanket wheel 20, and the temperature and humidity of the conveyance unit 30. The position of the mandrel 41 means the relative position of each of the mandrels 41 in the radial direction of the mandrel wheel 40.

Among the information indicating the state of each of the components of the printing machine 1, the plate pressure and the printing pressure are especially important because they are directly linked to the transferability of the ink from the printing plate 14 to the blanket 25 and the transferability of the ink from the blanket 25 to the printed material P. With the present embodiment, the printing machine 1 is configured to be able to collect and visualize the information regarding the plate pressure and the printing pressure, and evaluate the visualized information.

To be more specific, as illustrated in FIGS. 3 and 4, the printing machine 1 includes the distance sensor 71, a slip ring 74, the temperature sensor 75, a mandrel distance sensor 76, a controller 80, a display device 91, and a communication device 92.

The distance sensor 71 is configured to measure the distance of the printing plate 14 to the blanket wheel 20. The distance of the printing plate 14 to the blanket wheel 20 means the distance of the plate surface of the printing plate 14 to the blanket wheel 20, and indicates the relative position of the surface of the printing plate 14 in the radial direction of the blanket wheel 20.

The distance of the printing plate 14 to the blanket wheel 20 correlates with the plate pressure. The shorter the distance of the printing plate 14 to the blanket wheel 20 is, the greater the pressing force of the printing plate 14 on the blanket 25 inward in the radial direction of the blanket wheel 20 is, and therefore the plate pressure is increased. On the other hand, the longer the distance of printing plate 14 to the blanket wheel 20 is, the smaller the pressing force of the printing plate 14 on the blanket 25 inward in the radial direction of the blanket wheel 20 is, and therefore the plate pressure is reduced.

The distance sensor 71 is a non-contact sensor, which may be, for example, a reflective displacement sensor using laser light. To be more specific, as illustrated in FIG. 4, the distance sensor 71 includes a head 72 having a light emitter and a light receiver for laser light, and an amplifier 73 configured to amplify the laser light received by the head 72.

The one distance sensor 71 is provided in the blanket wheel 20. To be more specific, the head 72 is disposed between the segments 21 and faces outward in the radial direction of the blanket wheel 20. The amplifier 73 is disposed between the segment 21 and the spindle 22 in the blanket wheel 20. For example, the amplifier 73 may be attached to the outer surface of a bearing 23 rotatably supporting the spindle 22, or attached to a spoke 24 near the bearing 23. The distance sensor 71 measures the distances of the printing plates 14 provided for colors different from each other to the blanket wheel 20 while rotating integrally with the blanket wheel 20.

Moreover, the distance sensor 71 is provided in the blanket wheel 20 and rotates integrally with the blanket wheel 20, and therefore can measure the distances of the printed materials P held by the mandrels 41 to the blanket wheel 20. The number of the mandrels 41 is equal to the integral multiple of the number of the blankets 25, and therefore the distance sensor 71 measures the distance of the printed material P held by the same mandrel 14 to the blanket wheel 20 every time the mandrel wheel 40 rotates once. The distance of the printed material P to the blanket wheel 20 means the distance of the outer periphery of the printed material P to the blanket wheel 20, and indicates the relative position of the printed material P in the radial direction of the blanket wheel 20.

The distance of the printed material P to the blanket wheel 20 correlates with the printing pressure. The shorter the distance of the printed material P to the blanket wheel 20 is, the greater the pressing force of the blanket 25 on the printed material P outward in the radial direction of the blanket wheel 20 is, and therefore the printing pressure is increased. On the other hand, the longer the distance of the printed material P to the blanket wheel 20 is, the smaller the pressing force of the blanket 25 on the printed material P outward in the radial direction of the blanket 20 is, and therefore the printing pressure is reduced.

Moreover, the distance sensor 71 is connected by wire to controller 80 via the slip ring 74. To be more specific, the head 72 is connected by wire to the amplifier 73 by using, for example, a cable. The amplifier 73 is connected by wire to the controller 80 provided outside the blanket wheel 20 via the slip ring 74 by using, for example a cable. The thick solid line indicates a cable in FIG. 4.

The temperature sensor 75 is configured to measure the temperature of the printing plate 14. The temperature of the printing plate 14 measured by the temperature sensor 75 is the plate surface temperature of the printing plate 14. The plate surface temperature of the printing plate 14 correlates with the temperature of the ink. When the plate surface temperature of the printing plate 14 is changed, the temperature of the ink is changed. When the temperature of the ink is changed, the viscosity of the ink is changed to cause printing failure such as the blurring of ink, the bleeding of ink, the scumming of the printed material P due to the splash of ink, or the turbidity of ink.

The temperature sensor 75 is a non-contact sensor, which may be, for example, a radiation thermometer. As illustrated in FIG. 4, like the distance sensor 71, the one temperature sensor 75 is provided in the blanket wheel 20. To be more specific, the temperature sensor 75 is disposed between the segments 21 of the blanket wheel 20 and faces outward in the radial direction of the blanket wheel 20. The temperature sensor 75 is connected by wire to the controller 80 via the slip ring 74. The temperature sensor 75 measures the plate surface temperatures of the printing plates 14 provided for colors different from each other while rotating integrally with the blanket wheel 20.

The mandrel distance sensor 76 is provided outside the mandrel wheel 40 and configured to measure the distance to the mandrel 41. As illustrated in FIG. 1, the mandrel distance sensor 76 is provided above the mandrel wheel 40. The mandrel distance sensor 76 is a non-contact sensor, which may be, for example, a reflective displacement sensor using laser light.

The distance measured by the mandrel distance sensor 76 indicates the relative position of each of the mandrels 41 in the radial direction of the mandrel wheel 40. If the relative position of each of the plurality of mandrels 41 provided on the mandrel wheel 40 varies, the position of each of the printed materials P held by the mandrels 41 also varies. As a result, the distance of the printed material P to the blanket wheel 20 is different for each of the printed materials P, and therefore the printing pressure is different for each of the printed materials P. The printing machine 1 measures the difference in the relative position of the mandrels 41 with respect to one mandrel 41 which is a predetermined reference, and, when the mandrel 41 with a difference beyond the allowable range is identified, the position of this mandrel 41 is adjusted in an appropriate manner. This measurement by the mandrel distance sensor 76 is performed when the operation of the printing machine 1 is stopped, that is, when the printing machine 1 is adjusted.

The controller 80 is configured to generally control each of the components of the printing machine 1. The controller 80 may be, for example, a PLC (programmable logic controller) including a processor, a storage device, and a program executing the function of the printing machine 1. The controller 80 knows the state of each of the components of the printing machine 1 based on the result of the measurement by each of the sensors provided in the printing machine 1, in order to find an abnormality. With the present embodiment, a process performed by the controller 80 to monitor to know the state of each of the components of the printing machine 1 in order to find an abnormality may be referred to as "state monitoring process." In addition, with the present embodiment, a method of performing the state monitoring process to know the state of the printing machine 1 in order to find an abnormality may be referred to as "state monitoring method." Details of the state monitoring process will be described later with reference to FIG. 5.

The display device 91 may be, for example, a display or a personal digital assistance. The display device 91 displays the result of the measurement performed by each of the sensors provided in the printing machine 1, according to a command from the controller 80.

The communication device 92 may be a wireless or wire communication module formed integrally with the controller 80. The communication device 92 transmits the result of the measurement performed by each of the sensors provided in the printing machine 1 to an external production management device, according to a command from the controller 80. The production management device centrally manages the operation states of the plurality of printing machines 1 in a location apart from the printing machine 1.

<State Monitoring Process>

Figure 5:
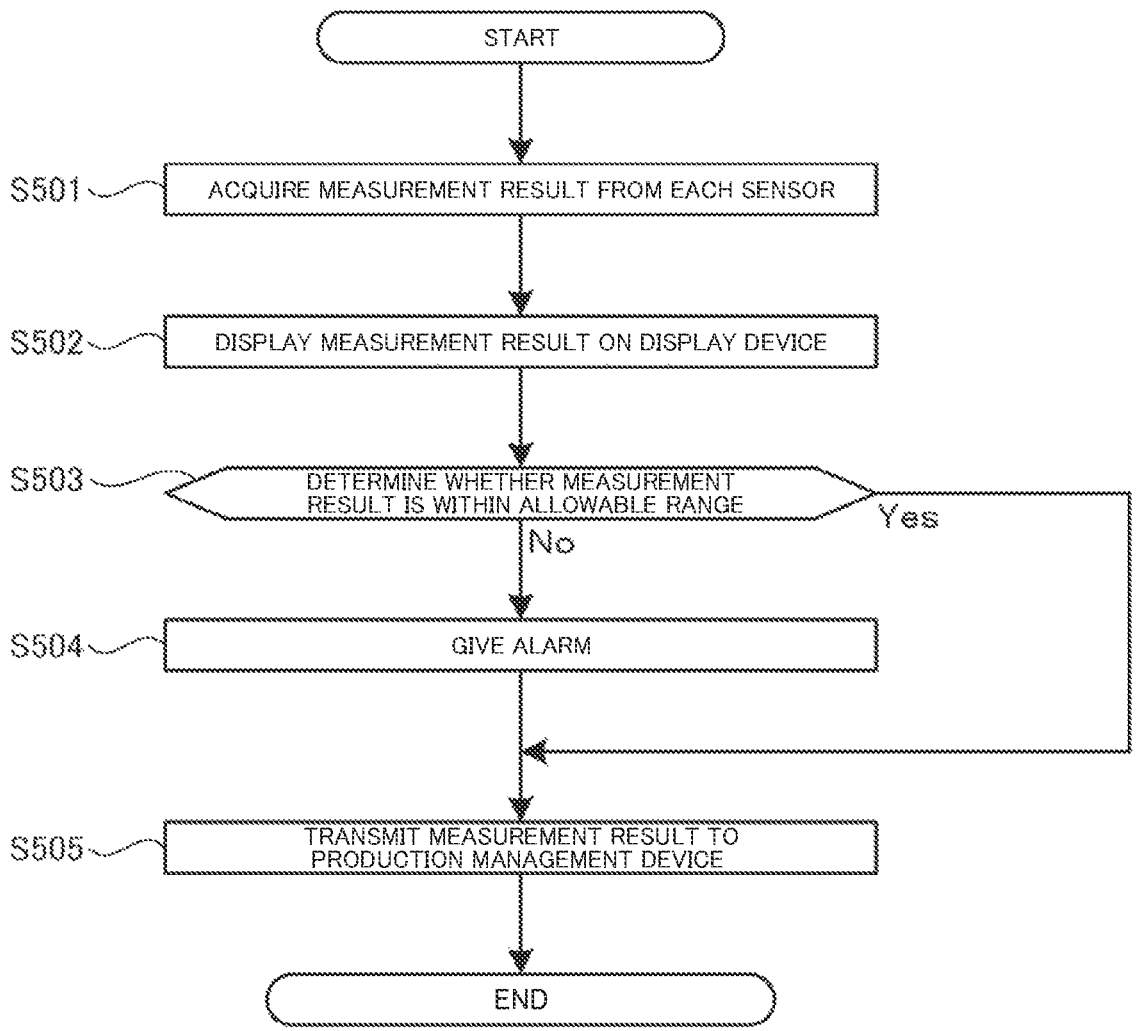
FIG. 5 is a flowchart illustrating a state monitoring process performed by a controller illustrated in FIG. 3.
Figure 6:
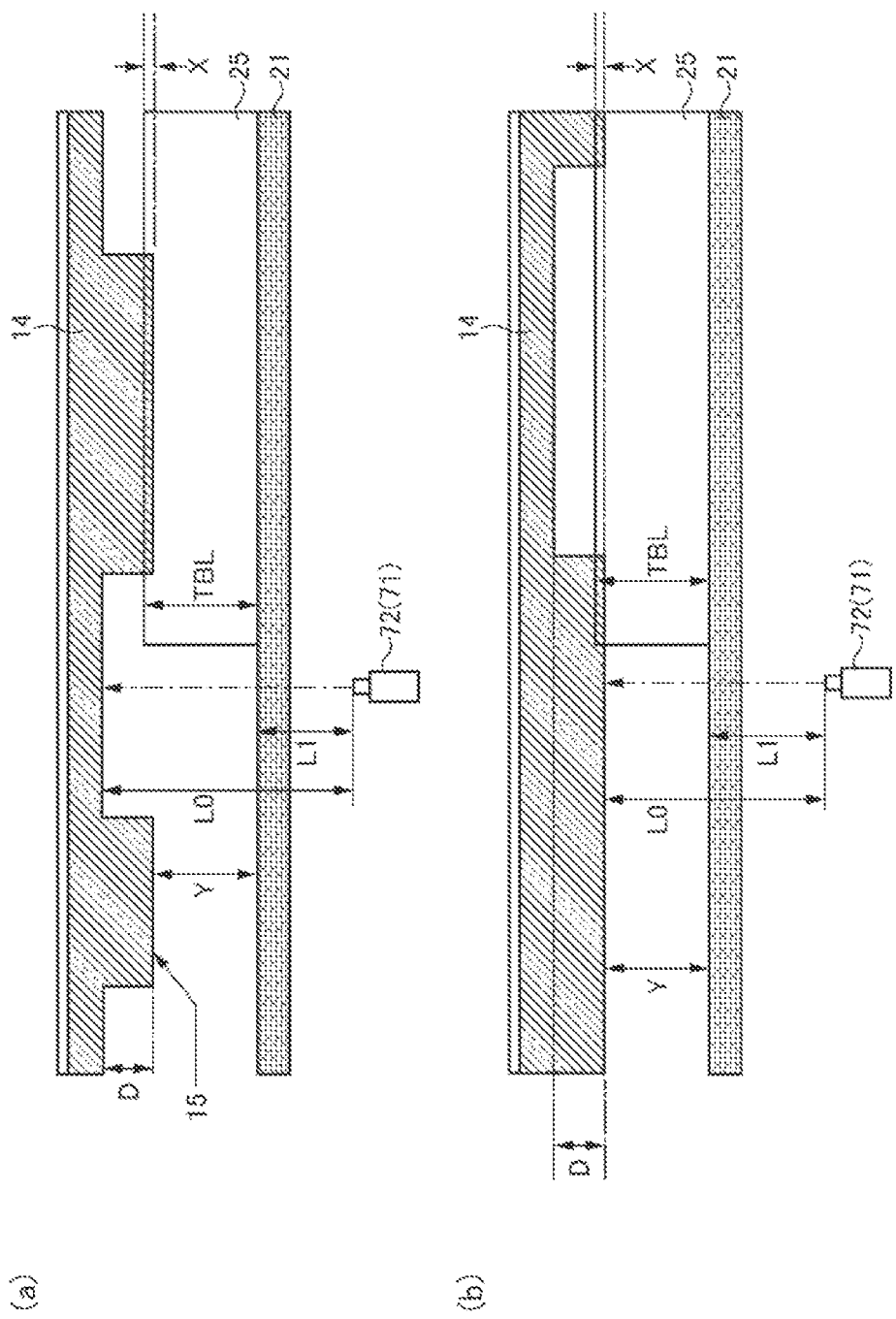
FIG. 6 illustrates how to calculate a push amount and a gauge thickness which are indexes indicating the state of a plate pressure.

FIG. 5 is a flowchart illustrating a state monitoring process performed by the controller 80 illustrated in FIG. 3. FIG. 6 illustrates how to calculate a push amount X and a gauge thickness Y which are indexes indicating the state of the plate pressure. In FIG. 6(a), the printing plate 14 is a resin letterpress plate. In FIG. 6(b), the printing plate 14 is a waterless lithographic plate.

The state monitoring process is performed to monitor to know the state of each of the components of the printing machine 1 in order to find an abnormality. The controller 80 performs the state monitoring process in real time when the printing machine 1 is operated, that is, when the printing machine 1 prints on the printed materials P. However, the controller 80 also performs the state monitoring process when the operation of the printing machine 1 is stopped, that is, when the printing machine 1 is adjusted, depending on the kind of the information indicating the state of each of the components of the printing machine 1.

For example, when the information indicates the states of the plate pressure and the printing pressure, the controller 80 performs the state monitoring process for the plate pressure and the printing pressure when the printing machine 1 is operated. Meanwhile, when the information indicates the state of the position of the mandrel 41, the controller 80 performs the state monitoring process for the position of the mandrel 41 when the operation of the printing machine 1 is stopped. However, the controller 80 may perform the state monitoring process for the printing pressure when the operation of the printing machine 1 is stopped.

FIG. 5 illustrates the state monitoring process for the plate pressure and printing pressure which are especially important among the information indicating the state of each of the components of the printing machine 1.

In step S501, the controller 80 causes the distance sensor 71 and the temperature sensor 75 provided in the printing machine 1 to perform measurements, and acquires the measurement results. The result of the measurement performed by the distance sensor 71 includes the distance of each of the printing plates 14 to the blanket wheel 20, and the distance of the printed material P to the blanket wheel 20. The distance of each of the printing plates 14 to the blanket wheel 20 indicates the state of the plate pressure of each of the printing plates 14. The distance of the printed material P to the blanket wheel 20 indicates the state of the printing pressure. The result of the measurement performed by the temperature sensor 75 indicates the plate surface temperature of each of the printing plates 14.

The result of measuring the distance of the printing plate 14 to the blanket wheel 20 performed by the distance sensor 71 indicates the state of the plate pressure. Here, the controller 80 can calculate the push amount X and the gauge thickness Y as indexes more accurately indicating the state of the plate pressure. The push amount X is an amount of depth into which the blanket 25 is pressed by the contact with the printing plate 14. The gauge thickness Y is the distance between a bearer 15 of the printing plate 14 and the outer surface of the segment 21. The bearer 15 is a ring shaped member provided at each end of the plate cylinder 13. The gauge thickness Y is equivalent to the distance of the printing plate 14 to the blanket wheel 20 as described above. The controller 80 calculates the push amount X and the gauge thickness Y by using the result of the measurement performed by the distance sensor 71, which indicates the distance of the printing plate 14 to the blanket wheel 20.

As illustrated in FIG. 6(*a*), when the printing plate 14 is a resin letterpress plate, the controller 80 calculates the push amount X and the gauge thickness Y as follows. Here, D denotes the etched depth of the printing plate 14, L0 denotes the measured value by the distance sensor 71, L1 denotes the reference distance between the head 72 of the distance sensor 71 and the outer surface of the segment 21, and TBL denotes the thickness of the blanket 25. The controller 80 calculates the push amount X and the gauge thickness Y by using the following equations.

$$X=(D+TBL+L1)-L0$$

$$Y=L0-(D+L1)$$

As illustrated in FIG. 6(*b*), when the printing plate 14 is a waterless lithographic plate, the controller 80 calculates the push amount X and the gauge thickness Y by using the following equations.

$$X=(TBL+L1)-L0$$

$$Y=L0-L1$$

As described above, as the result of the measurement performed by the distance sensor 71, the controller 80 can acquire the push amount X and the gauge thickness Y as well as the measured value by the distance sensor 71. Therefore, even though the kind of the printing plate 14 and the thickness of the blanket 25 are changed, the controller 80 can correctly know the state of the plate pressure reflecting these changes. Here, when the operator needs to know the state of the plate pressure by hand, the gauge thickness Y is measured by using a clearance gauge. When the printing machine 1 is adjusted, the gauge thickness Y acquired from the measured value of the distance sensor 71 may be compared to the gauge thickness Y measured by hand, and a correction value may be added to the measured value of the distance sensor 71 if necessary.

In step S502, the controller 80 causes the display device 91 to display the results of the measurements performed by the distance sensor 71 and the temperature sensor 75 acquired in the step S501. By this means, the controller 80 can visualize the states of the plate pressure, the printing pressure, and the plate surface temperature of the printing plate 14 in real time. Here, the printing machine 1 can measure the distance of the printing material P to the blanket wheel 20 (printing pressure) at any time during the operation. However, in order to improve the accuracy of the measurement, the operation of the printing machine 1 may be periodically stopped for the measurement.

In step S503, the controller 80 evaluates the measurement results acquired in the step S501, and determines whether the measurement results are within the allowable range. By this means, the controller 80 can determine whether the printing machine 1 is operated in the appropriate states of the plate pressure, the printing pressure and the plate surface temperature of the printing plate 14. The allowable range indicates the range of numerical values that permits the difference between the preset reference value and the measurement result. The reference value and the allowable range can be changed depending on the kind of the printed material P, the kind of the printing plate 14, and the subject matter of the printed image. The controller 80 moves the step to step S505 when the measurement result is within the allowable range. On the other hand, when the measurement result is out of the allowable range, the controller 80 moves the step to step S504. Here, for the printing machine 1, the determination in the step S503 may be performed by the operator, and, when the measurement result is out of the allowable range, or when a significant change is recognized even though the measurement result is within the allowable range, the operator can immediately adjust the printing machine 1.

In the step S504, the controller 80 gives an alarm. For example, the controller 80 causes the display device 91 to display an alarm, lights a warning lamp, or provides a warning sound. By this means, the controller 80 can immediately notify the operator that the state of the plate pressure, the printing pressure, or the plate surface temperature of the printing plate 14 is not appropriate. The operator can adjust the printing machine 1 immediately in response to the alarm. Alternatively, the printing machine 1 can automatically adjust the printing machine 1 by itself.

In the step S505, the controller 80 causes the communication device 92 to transmit the measurement results acquired in the step S501 and the result evaluated and determined in the step S503 to the external production management device. By this means, the external production management device can manage the state of the printing machine 1 in real time. After that, the controller 80 ends this process.

The process of monitoring the plate pressure and the printing pressure has been described with reference to FIG. 5. Next, the process of monitoring the positions of the mandrels 41 performed by the controller 80 will be described.

When the operation of the printing machine 1 is stopped, the controller 80 acquires the result of the measurement performed by the mandrel distance sensor 76 (step S501) by the operation of the operator, and causes the display device 91 to display this measurement result (step S502). The mandrel distance sensor 76 measures the plurality of mandrels 41 provided on the mandrel wheel 40. The result of the measurement performed by the mandrel distance sensor 76 indicates the relative position of each of the plurality of mandrels 41 in the radial direction of the mandrel wheel 40. The controller 80 determines whether the relative position of each of the mandrels 41 other than a predetermined reference mandrel 41 with respect to the predetermined reference mandrel 41 is within the allowable range (step S503). Then, the controller 80 gives an alarm when the relative position of each of the mandrels 41 is out of the allowable range (step S504). In response to the alarm, the operator can identify the mandrel 41 whose relative position is out of the allowable range, and immediately adjust the relative position of the identified mandrel 41. Then, the controller 80 causes the communication device 92 to transmit the measurement result indicating the relative position of each of the mandrels 41 and the result of the evaluation and the determination of the measurement result to the external production management device (step S505).

<Operational Advantage>

As described above, the printing machine 1 includes the distance sensor 71 configured to measure the distance of the printing plate 14 to the blanket wheel 20, and the temperature sensor 75 configured to measure the temperature of the printing plate 14, which are provided in the blanket wheel 20. By this means, even though the blanket wheel 20 or the plate cylinder 13 is thermally deformed, the distance sensor 71 can accurately measure the distance of the printing plate 14 to the blanket wheel 20.

When the distance sensor is provided outside the blanket wheel and measures the plate pressure, it is difficult to accurately measure the plate pressure. In particular, when the distance sensor measures the distance between the spindle of the blanket wheel and that of the plate cylinder, it is difficult to measure the distance taking into account the effect of a change in dimension due to the thermal deformation of the blanket wheel or the plate cylinder.

In contrast, the distance sensor 71 is provided in the blanket wheel 20, and therefore it is possible to measure the distance of the printing plate 14 to the blanket wheel 20 taking into account the effect of a change in dimension due to the thermal deformation of the blanket wheel 20 or the plate cylinder 13. Accordingly, the distance sensor 71 can accurately measure the distance of the printing plate 14 to the blanket wheel 20. Consequently, the printing machine 1 can correctly know the state of the plate pressure to find an abnormality.

Moreover, the distance sensor 71 and the temperature sensor 75 are provided in the blanket wheel 20, and therefore rotate integrally with the blanket wheel 20. Accordingly, it is possible to measure the distance of the printing plate 14 and the plate surface temperature for each of the plurality of inking units 10 by the one distance sensor 71 and the one temperature sensor 75. By this means, for the printing machine 1, it is not necessary to provide a plurality of distance sensors 71 and a plurality of temperature sensors 75, and it is possible to measure the distance of the printing plate 14 to the blanket wheel 20 and the plate surface temperature of the printing plate 14 at the timing of the transfer of the ink from the printing plate 14 to the blanket 25. Therefore, the printing machine 1 can quickly and correctly know the states of the plate pressure and the plate surface temperature of the printing plate 14 with a simple configuration, in order to find an abnormality.

Moreover, the distance sensor 71 is provided in the blanket wheel 20 and rotates integrally with the blanket wheel 20, and therefore can measure the distance of the printed material P held by the mandrel 41 to the blanket wheel 20. Therefore, the printing machine 1 can measure the distance of the printing plate 14 to the blanket wheel 20 and also measure the distance of the printed material P to the blanket wheel 20 by the one distance sensor 71. Consequently, the printing machine 1 can correctly know the states of the plate pressure and the printing pressure with a simple configuration to find an abnormality.

Moreover, the distance sensor 71 and the temperature sensor 75 are non-contact sensors. Therefore, in contrast to a contact sensor such as a strain gauge, the distance sensor 71 does not need to process each of the plurality of blankets 25 to measure the plate pressure and the printing pressure. In addition, in contrast to a contact sensor such as a thermocouple, the temperature sensor 75 does not need to process the plate cylinder 13 or the printing plate 14 to measure the temperature. Therefore, the printing machine 1 can correctly know the states of the plate pressure, the printing pressure, and the plate surface temperature of the printing plate 14 with a simple configuration to find an abnormality, while reducing the work load and the cost.

Moreover, the distance sensor 71 and the temperature sensor 75 are connected by wire to the controller 80 via the slip ring 74. That is, for the printing machine 1, the distance sensor 71 and the temperature sensor 75 can be connected by wire to the controller 80 without worrying about the disconnection of the cable connecting the distance sensor 71 and the temperature sensor 75 to the controller 80. Therefore, in contrast to the wireless connection, the printing machine 1 can prevent the superimposed noise on the measurement result to be transmitted to the controller 80, and consequently acquire the accurate measurement result. In addition, in contrast to the wireless connection, the printing machine 1 can shorten the time to transmit the measurement result to the controller 80 and improve the stability of the transmission. Consequently, it is possible to quickly acquire the measurement result in a stable manner. As a result, it is possible to quickly and reliably know the true states of the plate pressure, printing pressure, and the plate surface temperature of the printing plate 14 to find an abnormality.

Moreover, the printing machine 1 includes the mandrel distance sensor 76 provided outside the mandrel wheel 40 and configured to measure the distance to the mandrel 41. Therefore, the printing machine 1 can quickly and easily measure the relative position of each of the plurality of mandrels 41 in the radial direction of the mandrel wheel 40. Then, the printing machine 1 can identify the mandrel 41 whose relative position is out of the allowable range, and quickly adjust this mandrel 41, and therefore can prevent variation in the printing pressure. Moreover, the mandrel distance sensor 76 performs the measurement when the operation of printing machine 1 is stopped. Therefore, in contrast to when the measurement is performed during the operation of the printing machine 1, it is possible to accurately measure the relative position of each of the mandrels 41 in the radial direction of the mandrel wheel 40. Consequently, the printing machine 1 can correctly know the state of the positions of the mandrels 41.

Another Embodiment

Figure 7:
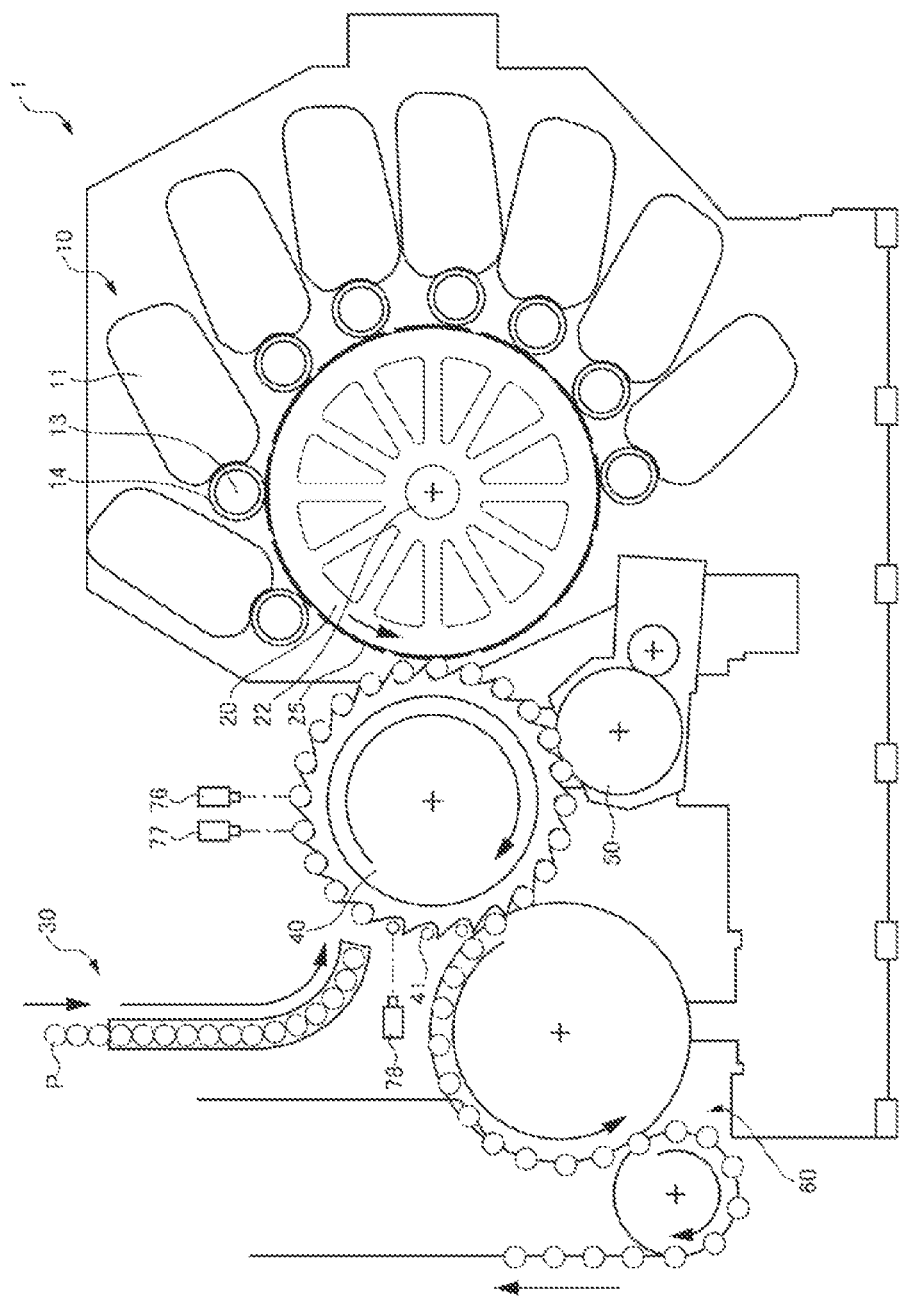
FIG. 7 schematically illustrates the configuration of the printing machine including a printed material temperature sensor and a mandrel temperature sensor.

FIG. 7 schematically illustrates the configuration of the printing machine 1 including a printed material temperature sensor 77 and a mandrel temperature sensor 78.

In addition to the temperature sensor 75 configured to measure the plate surface temperature of the printing plate 14, the printing machine 1 may include the printed material temperature sensor 77 configured to measure the temperature of the printed material P held by the mandrel 41, and the mandrel temperature sensor 78 configured to measure the temperature of the mandrel 41.

Each of the printed material temperature sensor 77 and the mandrel temperature sensor 78 is a non-contact sensor such as a radiation thermometer. The printed material temperature sensor 77 is provided outside the mandrel wheel 40 for a zone from a position where the mandrel 41 holds the printed material P to a position where the printed material P contacts the blanket 25. The mandrel temperature sensor 78 is provided outside the mandrel wheel 40 for a zone where the mandrels 41 do not hold the printed materials P.

The temperature of the mandrel 41 affects the temperature of the printed material P held by the mandrel 41. The temperature of the printed material P correlates with the temperature of the ink transferred to the printed material P. When the temperature of the printed material P is changed, the temperature of the ink transferring from the blanket 25 to the printed material P is changed. When the temperature of the ink is changed, the viscosity of the ink is changed to cause printing failure such as the blurring of ink, the bleeding of ink, the scumming of the printed material P due to the splash of ink, or the turbidity of ink.

The printing machine 1 can measure the temperature of the mandrel 41, and the temperature of the printed material P held by the mandrel 41, as well as the plate surface temperature of the printing plate 14. Therefore, the printing machine 1 can correctly know the states of the temperature of the mandrel 41 and the temperature of the printed material P, which are important to ensure the reproducibility of the printing, as well as the states of the plate pressure, the printing pressure and the plate surface temperature of the printing plate 14, in order to find an abnormality.

Here, with the above-described embodiments, the printing machine 1 includes both the distance sensor 71 and the temperature sensor 75, but may include one of the distance sensor 71 and the temperature sensor 75. That is, the printing machine 1 may include at least one of the distance sensor 71 and the temperature sensor 75. Then, the printing machine 1 may cause the distance sensor 71 and/or the temperature sensor 75 to perform the measurement, and determine whether the measurement result is within the allowable range. By this means, the printing machine 1 can correctly know the states of the plate pressure and the printing pressure of the printing machine 1, and/or the state of the plate surface temperature of the printing plate 14, in order to find an abnormality.

OTHERS

With the above-described embodiments, the printing machine 1 is an example of "printing machine" recited in the claims. The plate cylinder 13 is an example of "plate cylinder" recited in the claims. The printing plate 14 is an example of "printing plate" recited in the claims. The blanket wheel 20 is an example of "blanket wheel" recited in the claims. The blanket 25 is an example of "blanket" recited in the claims. The mandrel wheel 40 is an example of "mandrel wheel" recited in the claims. The mandrel 41 is an example of "mandrel" recited in the claims. The distance sensor 71 is an example of "distance sensor" recited in the claims. The slip ring 74 is an example of "slip ring" recited in the claims. The temperature sensor 75 is an example of "temperature sensor" recited in the claims. The mandrel distance sensor 76 is an example of "mandrel distance sensor" recited in the claims. The controller 80 is an example of "controller" recited in the claims. The printed material P is an example of "printed material" recited in the claims. The step S501 is an example of "acquiring" recited in the claim.

The features in the above-described embodiments may be compatible with each other. The above-described embodiments are not intended to limit the subject matter of the invention, and may be modified and changed without deviating from the scope of the claims.

The terms used in the above-described embodiments and the claims should not be construed as limitations. For example, "including" "having" or "comprising" elements should not be construed as "exclusively consisting of" the elements.

The invention claimed is:

1. A printing machine comprising:
   a printing plate attached to a plate cylinder;
   a blanket configured to transfer ink from the printing plate to a printed material;
   a blanket wheel configured to rotate the blanket; and
   at least one of a distance sensor or a temperature sensor,
   the distance sensor being provided in the blanket wheel and configured to measure a distance of the printing plate to the blanket wheel, and
   the temperature sensor being provided in the blanket wheel and configured to measure a temperature of the printing plate.

2. The printing machine according to claim 1, further comprising a mandrel wheel configured to rotate a mandrel holding the printed material,
   wherein the distance sensor measures a distance of the printed material held by the mandrel to the blanket wheel.

3. The printing machine according to claim 2, further comprising a mandrel distance sensor provided outside the mandrel wheel and configured to measure a distance to the mandrel.

4. The printing machine according to claim 3, wherein the mandrel distance sensor performs measurement when operation of the printing machine is stopped.

5. The printing machine according to claim 1, further comprising a controller configured to know a state of the printing machine, based on a measurement result by at least one of the distance sensor or the temperature sensor, in order to find an abnormality,
   wherein at least one of the distance sensor or the temperature sensor is connected by wire to the controller via a slip ring.

6. A method of monitoring a state of a printing machine including:
   a printing plate attached to a plate cylinder;
   a blanket configured to transfer ink from the printing plate to a printed material; and
   a blanket wheel configured to rotate the blanket,
   the method comprising:
   acquiring at least one of a result of measuring a distance of the printing plate to the blanket wheel by a distance sensor provided in the blanket wheel, or a result of measuring a temperature of the printing plate by a temperature sensor provided in the blanket wheel.

7. The method according to claim 6, wherein:
   the printing machine further comprises a mandrel wheel configured to rotate a mandrel holding the printed material;
   the distance sensor measures a distance of the printed material held by the mandrel to the blanket wheel; and
   the acquiring comprises acquiring a result of measuring a distance of the printing plate to the blanket wheel by the distance sensor, and a result of measuring a distance of the printed plate to the blanket wheel by the distance sensor.

8. The method according to claim 7, wherein:
   the printing machine further comprises a mandrel distance sensor provided outside the mandrel wheel and configured to measure a distance to the mandrel; and
   the acquiring comprises acquiring a result of measuring a distance to the mandrel by the mandrel distance sensor.

9. The method according to claim 8, wherein the mandrel distance sensor performs measurement when operation of the printing machine is stopped.

10. The method according to claim 6, wherein:
    the printing machine further comprises a controller configured to know a state of the printing machine, based on a measurement result by at least one of the distance sensor or the temperature sensor, in order to find an abnormality; and at least one of the distance sensor or the temperature sensor is connected by wire to the controller via a slip ring.

11. A printing machine comprising:

a mandrel configured to hold a printed material;

a mandrel wheel configured to rotate the mandrel; and a mandrel distance sensor provided outside the mandrel wheel and configured to measure a distance to the mandrel, and a processor, wherein the distance measured by the mandrel distance sensor indicates a position of the mandrel in a radial direction of the mandrel wheel, and the processor is configured to control the mandrel distance sensor to perform measurement when operation of the printing machine is stopped.

12. A method of monitoring a state of a printing machine including:

a mandrel configured to hold a printed material;

a mandrel wheel configured to rotate the mandrel; and a mandrel distance sensor provided outside the mandrel wheel and configured to measure a distance to the mandrel, wherein the distance measured by the mandrel distance sensor indicates a position of the mandrel in a radial direction of the mandrel wheel, the method comprising:

acquiring a result of measuring the distance to the mandrel by the mandrel distance sensor when operation of the printing mandrel is stopped.

\* \* \* \* \*